United States Patent
Wiercinski et al.

(10) Patent No.: US 6,867,254 B2
(45) Date of Patent: Mar. 15, 2005

(54) TWO-PHASE COMPOSITIONS

(75) Inventors: Robert A. Wiercinski, Lincoln, MA (US); Xiudong Sun, Arlington, MA (US)

(73) Assignee: W.R. Grace & Co., - Conn., Columbia, MD (US)

( * ) Notice: Subject to any disclaimer, the term of this patent is extended or adjusted under 35 U.S.C. 154(b) by 89 days.

(21) Appl. No.: 10/234,654

(22) Filed: Sep. 3, 2002

(65) Prior Publication Data

US 2003/0083423 A1 May 1, 2003

Related U.S. Application Data

(60) Provisional application No. 60/316,992, filed on Sep. 4, 2001.

(51) Int. Cl.[7] ............................................. C08F 122/02
(52) U.S. Cl. ..................... 524/556; 524/501; 524/47; 524/504; 524/505; 524/572; 524/525; 524/426; 428/35.7; 428/35.2; 428/47; 428/913; 428/517
(58) Field of Search ................................ 524/556, 501, 524/47, 504, 505, 522, 525, 426, 447, 574; 428/35.7, 35.2, 47, 913, 517

(56) References Cited

U.S. PATENT DOCUMENTS

| | | |
|---|---|---|
| 3,591,151 A | 7/1971 | Kerner |
| 3,886,107 A | 5/1975 | Najvar |
| 3,926,541 A | 12/1975 | Hewitt |
| 3,953,565 A | 4/1976 | Mizutani et al. |
| 3,972,328 A | 8/1976 | Chen |
| 3,978,018 A | 8/1976 | Self |
| 4,176,240 A | 11/1979 | Sabia |
| 4,189,619 A | 2/1980 | Pedlow |
| 4,192,785 A | 3/1980 | Chen et al. |
| 4,253,460 A | 3/1981 | Chen et al. |
| 4,280,943 A | 7/1981 | Bivens et al. |

(List continued on next page.)

FOREIGN PATENT DOCUMENTS

| | | |
|---|---|---|
| EP | 870498 | 10/1998 |
| JP | 55127446 | 10/1980 |
| JP | 56010546 | 2/1981 |
| JP | 57001741 | 1/1982 |

(List continued on next page.)

OTHER PUBLICATIONS

Vasudev S.C., et al., "Development of chitosan/polyethylene vinyl acetate co-matrix: controlled release of aspirin-heparin for preventing cardiovascular thrombosis," Biomaterials, Elsevier Science Publishers BV., Barking, GB, 18(5):375–381, 1997.

Primary Examiner—David W. Wu
Assistant Examiner—Satya B Sastri
(74) Attorney, Agent, or Firm—Hamilton, Brook, Smith & Reynolds, P.C.

(57) ABSTRACT

Disclosed is a composition comprising a hydrophobic polymer phase and a water-swollen superabsorbent polymer phase. Also disclosed is a two component system for preparing a composition comprising a hydrophobic polymer phase and a water-swollen superabsorbent polymer phase. The first component is an emulsion of the hydrophobic polymer; the second component comprises the superabsorbent polymer; and the first and second components form the composition when mixed.

25 Claims, 9 Drawing Sheets

U.S. PATENT DOCUMENTS

| | | |
|---|---|---|
| 4,309,331 A | 1/1982 | Graham |
| 4,427,737 A | 1/1984 | Cilento et al. |
| 4,477,325 A | 10/1984 | Osburn |
| 4,496,357 A | 1/1985 | Osburn |
| 4,537,805 A | 8/1985 | Lin |
| 4,538,603 A | 9/1985 | Pawelchak et al. |
| 4,551,490 A | 11/1985 | Doyle et al. |
| 4,615,739 A | 10/1986 | Clark et al. |
| 4,623,558 A | 11/1986 | Lin |
| 4,693,858 A | 9/1987 | Volke |
| 4,708,351 A * | 11/1987 | Midooka et al. ............ 277/650 |
| 4,728,442 A | 3/1988 | Shuttlewood et al. |
| 4,740,404 A * | 4/1988 | Otsugu et al. ................ 428/44 |
| 4,756,952 A * | 7/1988 | Sasayama et al. .......... 428/212 |
| 4,768,898 A | 9/1988 | Babendererde et al. |
| 4,851,044 A | 7/1989 | Stawinski |
| 4,952,618 A | 8/1990 | Olsen |
| 4,992,510 A | 2/1991 | Sugimori et al. |
| 5,011,875 A * | 4/1991 | Yamamoto et al. ........... 524/45 |
| 5,075,373 A * | 12/1991 | Takemori et al. ............. 525/57 |
| 5,163,115 A | 11/1992 | Sheu |
| 5,175,197 A | 12/1992 | Gestner et al. |
| 5,250,576 A | 10/1993 | DesMarais et al. |
| 5,270,358 A | 12/1993 | Asmus |
| 5,278,217 A * | 1/1994 | Umeda et al. ............... 524/394 |
| 5,290,844 A * | 3/1994 | Otsuka ....................... 524/426 |
| 5,306,867 A | 4/1994 | Connole et al. |
| 5,334,646 A | 8/1994 | Chen |
| 5,336,708 A | 8/1994 | Chen |
| 5,369,155 A | 11/1994 | Asmus |
| 5,399,603 A | 3/1995 | Sloan et al. |
| 5,466,724 A | 11/1995 | Volke et al. |
| 5,534,304 A | 7/1996 | Geursen et al. |
| 5,534,561 A | 7/1996 | Volke |
| 5,622,711 A | 4/1997 | Chen |
| 5,633,010 A | 5/1997 | Chen |
| 5,649,041 A | 7/1997 | Clyburn, III et al. |
| 5,672,640 A | 9/1997 | Brauer |
| 5,691,050 A | 11/1997 | Berg et al. |
| 5,719,201 A | 2/1998 | Wilson |
| 5,733,944 A | 3/1998 | Balk et al. |
| 5,739,203 A | 4/1998 | Ngoc |
| 5,741,828 A | 4/1998 | Stoy et al. |
| 5,756,555 A | 5/1998 | Wesch et al. |
| 5,763,014 A * | 6/1998 | Pickett .................... 427/430.1 |
| 5,800,647 A | 9/1998 | Andersen et al. |
| 5,814,032 A | 9/1998 | Hori et al. |
| 5,840,236 A | 11/1998 | Ngoc |
| 5,840,786 A | 11/1998 | Beck et al. |
| 5,879,722 A | 3/1999 | Andersen et al. |
| 5,928,741 A | 7/1999 | Andersen et al. |
| 5,994,450 A | 11/1999 | Pearce |
| 5,998,493 A | 12/1999 | Mitchell et al. |
| 6,025,422 A | 2/2000 | Hall |
| 6,026,567 A | 2/2000 | Swoyer et al. |
| 6,358,580 B1 * | 3/2002 | Mang et al. ................ 428/35.7 |

FOREIGN PATENT DOCUMENTS

| | | |
|---|---|---|
| JP | 58093791 | 6/1983 |
| JP | 59018766 | 1/1984 |
| JP | 84249797 | 11/1984 |
| JP | 60036502 | 2/1985 |
| JP | 62001703 | 1/1987 |
| JP | 62062871 | 3/1987 |
| JP | 62149335 | 7/1987 |
| JP | 1129087 | 5/1989 |
| JP | 2[1990]-296869 | 5/1989 |
| JP | 2494909 | 8/1990 |
| JP | 2296869 | 12/1990 |
| JP | 6157839 | 6/1994 |
| JP | 406157839 A | 6/1994 |
| JP | 406157839 A * | 7/1994 |
| JP | 8134298 | 5/1996 |
| JP | 8337456 | 12/1996 |
| JP | 9239713 | 9/1997 |
| JP | 2673208 | 11/1997 |
| JP | 10072271 | 3/1998 |
| JP | 10286821 | 10/1998 |
| JP | 11005804 | 1/1999 |
| JP | 11171627 | 6/1999 |
| JP | 11324411 | 11/1999 |
| WO | WO 98/48858 | 11/1998 |
| WO | WO 98/50212 | 11/1998 |
| WO | WO 99/14282 | 3/1999 |
| WO | WO 99/45977 | 9/1999 |
| WO | WO 99/47623 | 9/1999 |
| WO | WO 99/54422 | 10/1999 |
| WO | WO 00/00552 | 1/2000 |

* cited by examiner

37 ● Superabsorbent Polymer
35 ◉ Hydrophobic Polymer

All water is absorbed by superabsorbent polymer. Coalesence of the hydrophobic polymer has occured 41 ◉ Hydrophobic Polymer    43 ● Superabsorbent Polymer 41 ◉ Hydrophobic Polymer    43 ● Superabsorbent Polymer 8 ● Superabsorbent Polymer 6 ◎ Hydrophobic Polymer 21 ● Superabsorbent Polymer 17A ◉ Hydrophobic Polymer 26 ● Superabsorbent Polymer 24 ○ Hydrophobic Polymer 2nd component is compound to adjust pH so that superabsorbent absorbs water Low pH - SAP not neutralized not swollen

TWO-PHASE COMPOSITIONS

RELATED APPLICATIONS

This application claims the benefit of U.S. Provisional Application No. 60/316,992, filed Sep. 4, 2001, the entire teachings of which are incorporated herein by reference.

BACKGROUND OF THE INVENTION

Polymeric materials are often converted into useful objects with pre-determined, three-dimensional shapes. Processes for manufacturing such objects typically involve first providing a low viscosity composition that is formed into the desired shape and then increasing the viscosity of the composition to maintain the shape. This typically involves providing a liquid composition, transforming into the desired shape, and converting into a solid. There are several variations of this process. For example, the liquid composition can be a solution of the polymeric material dissolved in an organic solvent or an aqueous dispersion of the polymeric material; the composition is transformed from a liquid into a solid by evaporation of an organic solvent or water. Alternatively, a liquid, reactive monomeric and or oligomeric polymer composition is formed into the desired shape and then transformed into a solid by a chemical reaction. In another variation, a polymeric composition is heated in order to transform it into a liquid and then cooled after being formed into the desired shape. These manufacturing processes all have shortcomings, which are described in greater detail in the following paragraphs.

Evaporation of a solvent (water or an organic solvent) from a composition is time consuming and therefore restricted to thin layers. This process is also dependent on temperature and humidity and involves loss of volume and thus shrinkage of the composition that can be severe enough that it results in cracking. Moreover, solvent evaporation presents environmental and health and safety issues. Although polymeric compositions processed as a monomeric and or oligomeric compositions are not sensitive to shrinkage and cracking problems, these materials are generally toxic and often contain reactive functionalities, including isocyannates, epoxides, amines, acrylates, and the like. Cure of these systems may be exothermic and the heat generated often has undesireable effects. Polymeric compositions processed by heat also do not have the level of shrinkage problems as the organic solvent and water-based materials and are relatively non-toxic. However, heat sensitive materials can not be processed by this means. Also, there is a risk of injury in processing polymeric materials with heat.

Therefore, the development of new compositions which can be shaped into desired forms without the aforementioned disadvantages would permit the more efficient manufacture of improved objects for consumer and industrial use.

SUMMARY OF THE INVENTION

It has now been found that novel two phase compositions are formed when aqueous emulsions of hydrophobic polymer particles are mixed with superabsorbents. Applicants have also discovered that these compositions have many unique and desirable properties. For example, articles having desired, three-dimensional shapes and coatings, sealants, adhesives, waterstops can be readily prepared from these compositions using processes that overcome many of the problems that accompany the manufacture of such items from polymer compositions by methods disclosed in the prior art. Based on these results, novel two-phase compositions, methods of preparing these compositions and two component systems for preparing these compositions are disclosed herein. Also disclosed are coatings, sealants, adhesives, profiles, waterstops and articles comprising these compositions.

One embodiment of the present invention is a composition comprising a hydrophobic polymer phase and a water-swollen superabsorbent polymer phase.

Another embodiment of the present invention is a coating, adhesive, sealant, waterstop or a molded, ejected, three-dimensional article. The coating, adhesive, sealant, profile, waterstop or article comprises a hydrophobic polymer phase and a water-swollen desiccant phase, or, alternatively, a water swollen superabsorbent polymer phase.

Another embodiment of the present invention is a two component system for preparing a composition comprising a hydrophobic polymer phase and a water-swollen superabsorbent polymer phase. The first component is an emulsion of the hydrophobic polymer, and the second component comprises the superabsorbent polymer. The first and second components form the composition when mixed.

Yet another embodiment of the invention is an aqueous emulsion comprising a hydrophobic polymer and a polymer which becomes superabsorbent or which significantly increases its capacity to absorb water when acid or base functional groups thereon are neutralized to form salt or ionic functional groups or when the temperature is adjusted above or below a threshold temperature. The pH and/or temperature of the emulsion, prior to effecting cure, is such that the polymer is not superabsorbent or such that its capacity to absorb water can be significantly increased by altering the pH or temperature of the emulsion. The compositions of the present invention can be prepared by adjusting the pH and/or temperature such that the polymer becomes superabsorbent or such that the polymer significantly increases its capacity to absorb water.

Yet another embodiment of the present invention is a method of preparing a composition comprising a hydrophobic polymer phase and a water-swollen superabsorbent polymer phase. The method comprises mixing two components. The first component is an emulsion of the hydrophobic polymer and the second component comprises the superabsorbent polymer.

Yet another embodiment of the present invention is a composition prepared by the methods described above.

The compositions of the present invention have many advantages compared with polymeric compositions prepared by other processes. A major advantage is the ability to rapidly process a liquid composition comprising an aqueous dispersion into a solid shape desired for end use without the need to remove the water, even for thick profiles. Water is retained, at least initially, in the conversion of the liquid composition into a solid. The transformation from a liquid into a solid may occur in minutes or even seconds. Another key feature is the rapid transformation from a liquid to a solid with little or no heat generation. In addition, the disclosed compositions and articles are relatively safe to prepare because organic solvents and toxic reactive chemistries such as isocyannates are generally not used in their preparation. Moreover, they are inherently fireproof because of the presence of hydrated or absorbed water. Thick single layer coatings and articles can be produced with little or no shrinkage, at least initially, upon cure. In addition, there is no need to evaporate water or solvents when preparing the disclosed compositions, thereby simplifying the manufacturing process and reducing waste. Finished goods can also be manufactured in processes that require little or no heat.

BRIEF DESCRIPTION OF THE DRAWINGS

FIG. 3A depicts the composition formed immediately after mixing a first component comprising an emulsion of hydrophobic polymer particles 35 in water and a second component comprising superabsorbent polymer particles 37. FIG. 3B depicts the composition after the superabsorbent particles 37 have begun to absorb water and thereby increase their volume at the expense of the continuous aqueous phase. The hydrophobic polymer particles 35 have begun to move closer together. FIG. 3C depicts the composition after the superabsorbent particles 37 have absorbed all or most of the water and the hydrophobic polymer particles 35 have coalesced into a continuous phase.

FIG. 4A depicts the composition formed immediately after mixing a first component comprising an emulsion of hydrophobic polymer particles 41 in water and a second component comprising superabsorbent polymer particles 43. The hydrophobic polymer particles 41 are dispersed in the aqueous phase of the polymer emulsion droplets and the superabsorbent particles 43 are dispersed in the oil phase. FIG. 4B depicts the mixture after the superabsorbent particles polymer 43 have begun to absorb water and have increased in volume at the expense of the aqueous phase of the polymer emulsion and the hydrophobic polymer particles in the polymer emulsion droplets have come closer together and into contact with the oil/water interface. FIG. 4C depicts the composition after the hydrophobic polymer particles 41 have begun to absorb oil and increase in volume at the expense of the oil. The superabsorbent particles 43 also continue to absorb water and increase in volume at the expense of the aqueous phase of the polymer emulsion. FIG. 4D illustrates the substantially cured composition after the hydrophobic polymer has absorbed all or most of the oil and the superabsorbent polymer has absorbed all or most of the water.

DETAILED DESCRIPTION OF THE INVENTION

Figure 1:
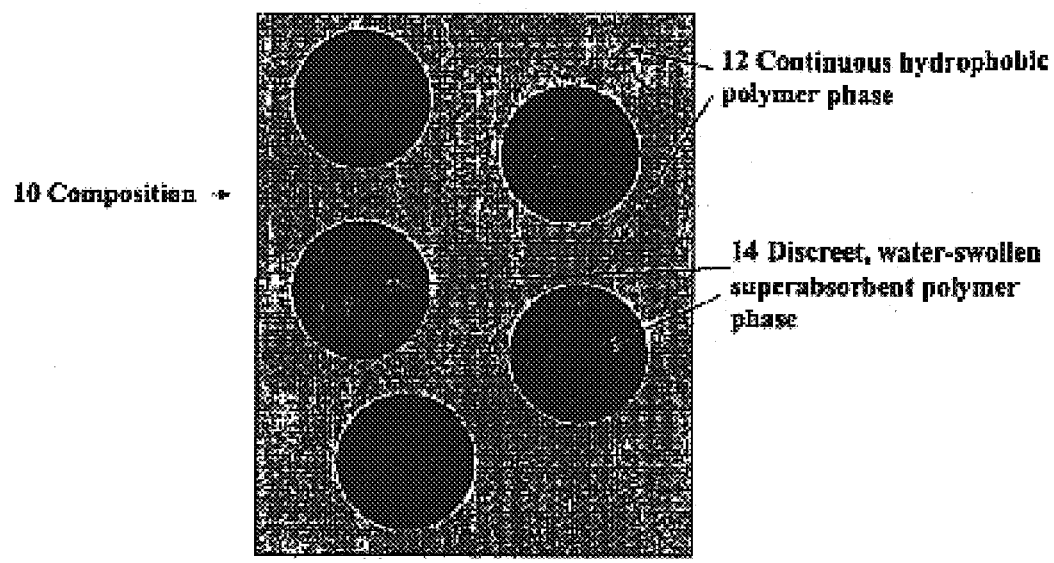
FIG. 1 is a diagram showing a composition of the present invention 10 comprising a continuous hydrophobic polymer phase 12 and a discreet water-swollen superabsorbent polymer phase 14.

"Phase" is a homogeneous portion of a composition that has uniform physical and chemical properties.

"Discrete phase" is a homogeneous portion of a composition that has uniform physical and chemical properties where there is not connectivity between all elements of the portion. Thus, a composition can comprise two or more portions of the same discrete phase that are physically isolated from each other by a continuous phase.

"Continuous phase" is a homogeneous portion of a composition that has uniform physical and chemical properties where there is connectivity between all elements of the portion.

A "hydrophobic polymer" is a polymer with a water solubility lower than 5% of its weight, e.g., no more than 5 grams of a hydrophobic polymer can dissolve when placed in 95 grams of water.

"Hydrophobic polymer phase" is a phase comprising a coalesced hydrophobic polymer.

"Water swollen superabsorbent polymer phase" is a phase comprising a superabsorbent polymer which has absorbed water, typically at least 10% of weight.

A "hydrophobic polymer emulsion" is an emulsion of hydrophobic polymer particles in an aqueous medium.

A "superabsorbent polymer" is a cross-linked hydrophilic polymer which can absorb at least 100% of its weight in water. Many superabsorbent polymers used herein can absorb greater amounts of water, e.g., at least 5 times their weight in water, often at least 20 times their weight in water, and in some cases, at least 100 times their weight in water, in some cases up to 1000 times their weight in water.

A "desiccant" is an inorganic material that reacts with water, absorbs water or adsorbs water, as described above for a superabsorbent polymer, or a combination thereof. A desiccant typically can absorb or react with water corresponding to at least 10% of its weight, preferably at least 50% of its weight, and more preferably at least 100% and, in some cases, at least 200% of its weight.

"Cross-linking" refers to the formation of covalent or ionic bonds between molecules such as polymeric molecules.

As used herein, "cure" refers to the process described herein whereby a superabsorbent polymer absorbs water from a hydrophobic polymer emulsion with the substantial exclusion of the hydrophobic polymer particles, and the hydrophobic polymer particles coalesce. Optionally, when an oil and/or cross-linking agent are present, "cure" also includes absorption of the oil by the hydrophobic polymer or cross-linking of the hydrophobic polymer with the cross-linking agent or both.

As used herein, "article" refers to a molded object. An object is "molded" when it has a reproducible, three dimensional shape that is pre-determined by a hollow form. The term "article" as it is used herein, also requires that the article be physically separated from the hollow form, i.e., ejected. A mixture which is applied to a surface and cured as a coating is not considered to be "three dimensional", within the meaning of the term as it is used herein.

"Profile" is a shape formed in a continuous process by extrusion of a composition through a die.

"Coating" is a composition that is applied to a surface of a substrate to act as a covering for the surface.

"Adhesive" is a composition that is applied to two or more substrates to bond the substrates to one another.

"Sealant" is a composition that is applied to two or more substrates to form a seal between the substrates.

One embodiment of the present invention is a composition comprising a hydrophobic polymeric phase and a water-swollen superabsorbent polymer phase. In a preferred embodiment, the hydrophobic polymer phase is present in an amount no less than 30% (preferably no less than 60%) by weight of the total composition and in an amount no more than 99% (preferably no more than 90%) by weight of the total composition; the water-swollen superabsorbent polymer phase is present in an amount no less than 1% (preferably no less than 10%) by weight of the total composition and in an amount no more than 70% (preferably no more than 40%) by weight of the total composition; and the superabsorbent polymer is present in an amount no less than 0.1% (preferably no less than 2.0%) by weight of the water-swollen superabsorbent polymer phase and no more than 90% (preferably no more than 20%) by weight of the water-swollen superabsorbent polymer phase.

Figure 3A:
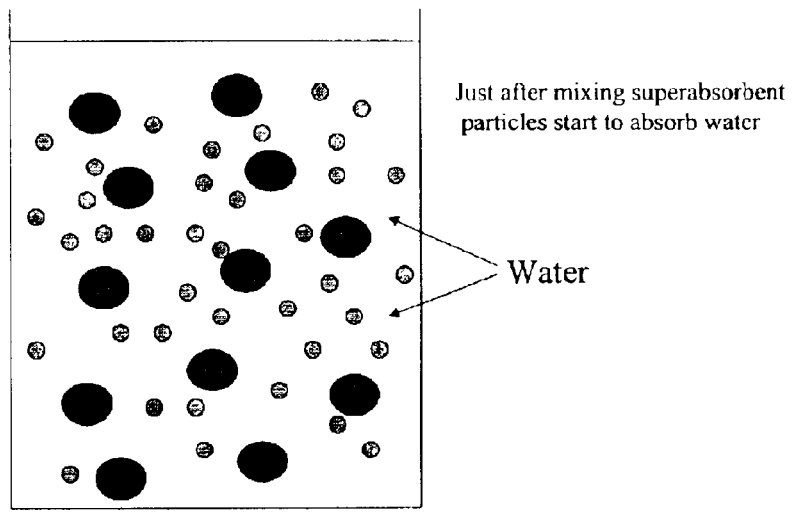
FIGS. 3A–3C are diagrams illustrating the curing process used to prepare the compositions of the present invention.
Figure 3B:
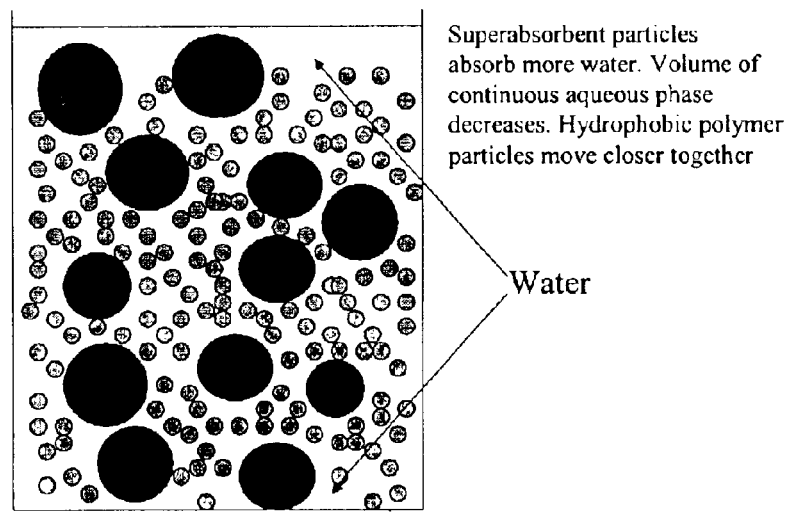
Figure 3C:
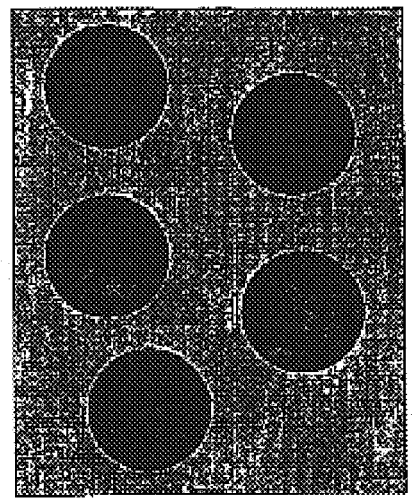
Figure 4A:
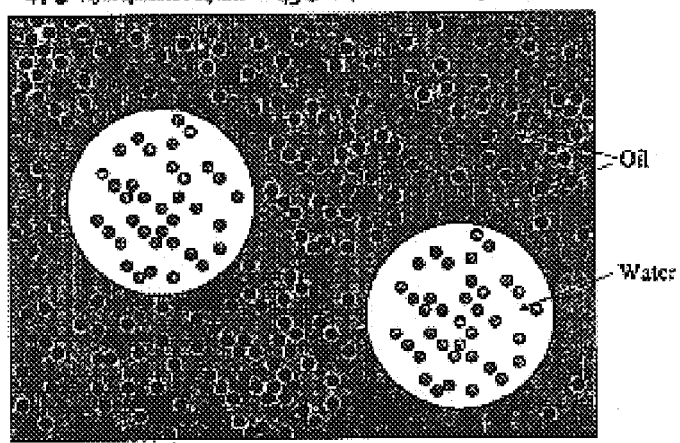
FIGS. 4A–4D are diagrams illustrating the curing process used to prepare compositions of the present invention when oil is present in the second composition.
Figure 4B:
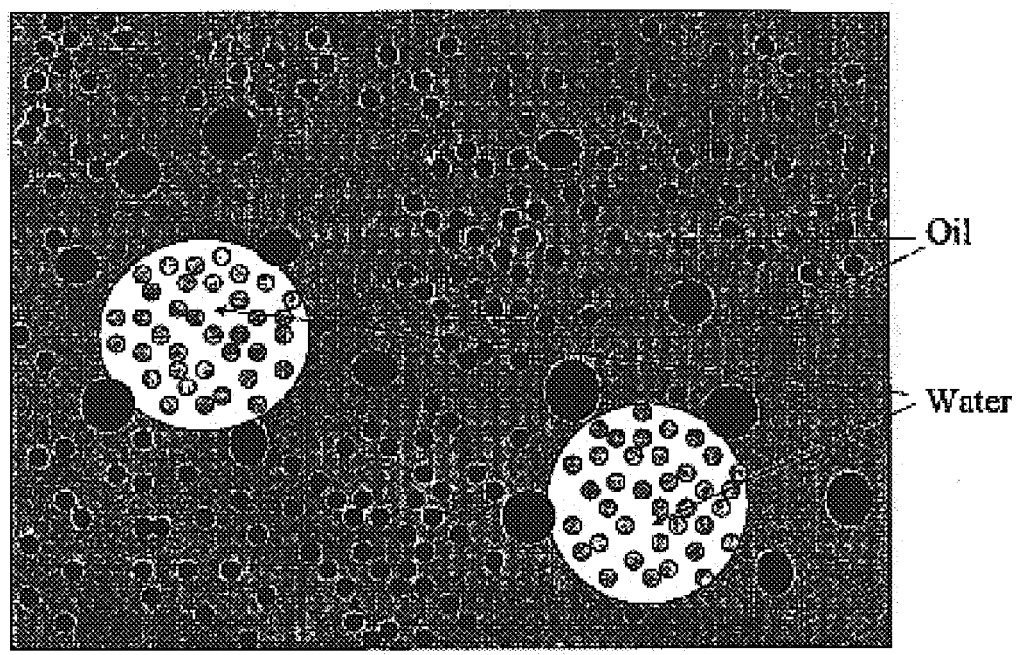
Figure 4C:
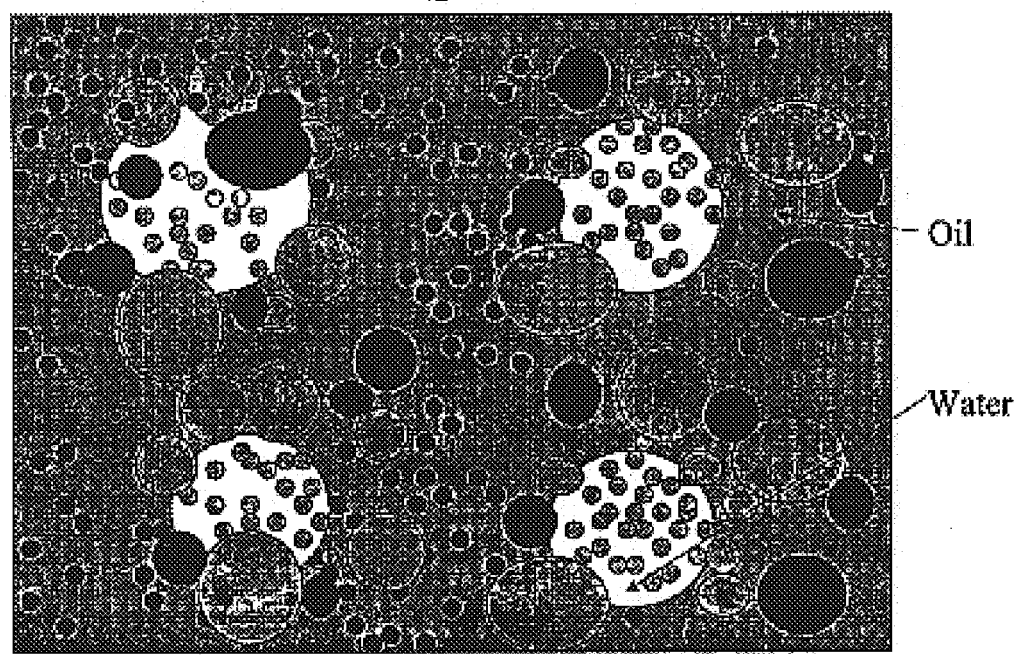
Figure 4D:
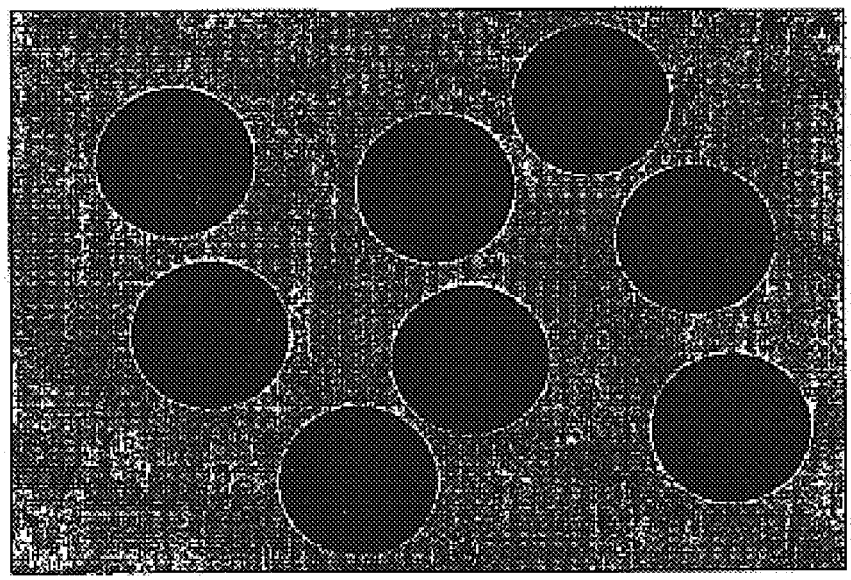

The disclosed compositions are formed by mixing a first component comprising hydrophobic polymer particles dispersed in an aqueous phase and a second component comprising a superabsorbent polymer particles and allowing the mixture to cure, thereby forming the composition. Curing is characterized by absorption of water by the superabsorbent particles, with the substantial exclusion of the hydrophobic polymer particles, thereby increasing the volume of the superabsorbent particles at the expense of the aqueous phase of the polymer emulsion. As water is absorbed by the superabsobent polymer particles, the hydrophobic polymer particles come closer together and coalesce, thereby forming a hydrophobic polymer phase. Simultaneously, the superabsorbent polymer particles form the water-swollen superabsorbent polymer phase. This process is shown schematically in FIGS. 3A–3C.

When preparing two phase compositions by the methods disclosed herein, the quantities of each ingredients used correspond to the quantity desired in the final two phase composition.

In one aspect, the mixture does not begin to cure until there is an initiating or "triggering" event. Specifically, certain polymers which otherwise absorb little or no water become superabsorbent as a result of the triggering event. Other polymers which are superabsorbent can substantially increase their capacity to absorb water (e.g., increase their capacity to absorb water at least two fold, preferably at least five fold and more preferably at least ten fold) as a result of a triggering event. A triggering event can be a temperature change or pH adjustment, which thereby initiates the cure process. A polymer which has been "triggered" to become superabsorbent or a superabsorbent polymer which has been "triggered" to significantly increase its capacity to absorb water is said to be "water-swellable" and becomes water-swollen. Prior to "triggering", such polymers are said to be "pre-water swollen". A pre-water swollen polymer thus either does not superabsorb until triggered or is significantly below its water absorbing capacity (e.g., at least two fold below its capacity, preferably at least five fold and more preferably at least ten fold) until triggered.

Polymers which become superabsorbent after a pH adjustment or whose water absorbing capacity significantly increases after a pH adjustment include water insoluble polymers comprising acid functional groups such as carboxylic acids and polymers comprising basic functional groups such as tertiary amines. These polymers become superabsorbent or significantly increase their water absorbing capacity when acid or base functionalities are neutralized, which refers to adjusting the pH until sufficient acid or base functional groups are transformed into salts or ionic compounds such that the polymers become water-swellable. The water swellability of polymers with acidic functional groups increases as the groups are neutralized and become anionic; similarly, the water-swellability of polymers with basic functional groups increases as the groups are neutralized and become cationic. When using these polymers to prepare the disclosed compositions, the polymer can be neutralized prior to combining with the first component. Alternatively, the polymer is neutralized after combining the first and second components. Waiting until after the components are mixed to neutralize the polymer can be advantageous in that the mixture is stable until "triggered" and can be further manipulated, for example, transported, divided or measured, prior to initiating the curing process. Superabsorbent polymers which require triggering events before absorbing water or which significantly increase their water absorbing capacity when "triggered" are discussed in greater detail below.

Changing the temperature is a trigger for other types of superabsorbents. For example, polymers such as N-isopropyl acrylamide absorb more water at temperatures below 37° C. then above this temperature. Thus, this superabsorbent can be mixed with a hydrophobic polymer emulsion at temperatures above 37° C. without "cure" occurring. When the temperature is lowered, greater swelling of the superabsorbent occurs and the cure process is initiated. Temperature triggered polymers comprising N-isopropylacrylamide are made by Jartherm Industries Inc. of Newark, N.J. and are available under the tradename JARTHERM. These polymers have transition temperatures in the range of 20° C. to 40° C.

Figure 2:
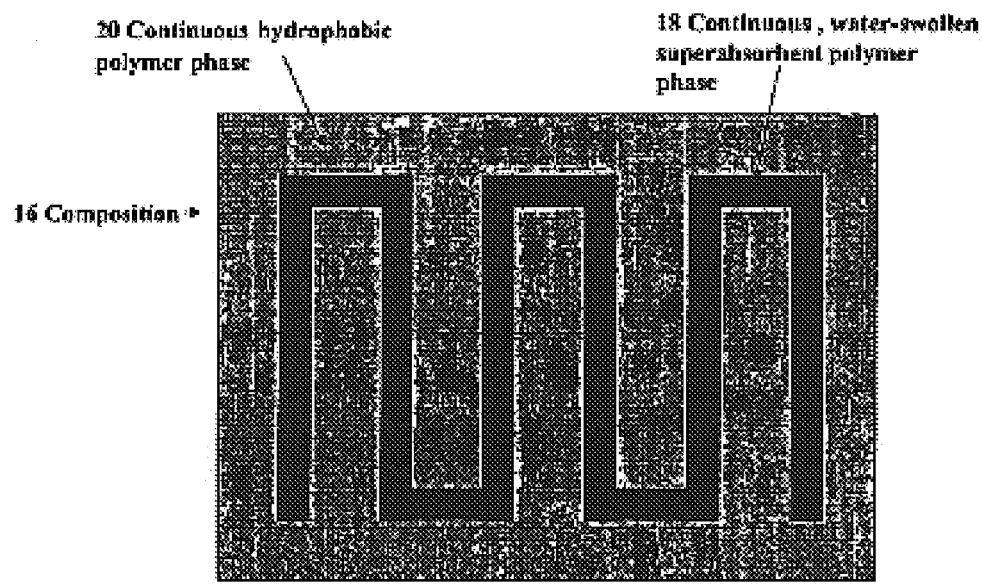
FIG. 2 is a diagram showing a composition of the present invention 16 comprising a continuous hydrophobic polymer phase 20 and a continuous water-swollen superabsorbent phase 18.

The product of this process can have one of several morphologies. For example, the composition can have a continuous phase comprising a hydrophobic polymer and a discreet phase comprising a water-swollen superabsorbent polymer. This morphology is illustrated in FIG. 1. As the percentage by weight of the hydrophobic polymer in the composition exceeds 50%, the likelihood of forming this morphology increases. Alternatively, the composition has a continuous hydrophobic polymer phase and a continuous water-swollen superabsorbent phase. This second morphology is illustrated in FIG. 2. The likelihood of forming this morphology increases as the percentage by weight of hydrophobic polymer and water-swollen superabsorbent polymer in the composition both approach 50%.

Optionally, the mixture formed from the combination of the first and second components additionally comprises an oil that swells or dissolves the hydrophobic polymer particles. The oil can be added to the mixture as a third component. Alternatively, the second component is a mixture of the superabsorbent polymer particles dispersed in the oil. After mixing, the superabsorbent polymer absorbs water from the emulsion, with the substantial exclusion of the hydrophobic polymer particles, and the hydrophobic polymer particles come into contact with the oil water interface where the hydrophobic polymer particles can absorb oil. The hydrophobic polymer phase in this example increases in size at the expense of the aqueous phase of the polymer emulsion. The resulting product is a continuous phase of oil swollen polymer and a discreet phase of water-swollen superabsorbent polymer. This process is depicted in FIGS. 4A–4D.

When oil is present, the hydrophobic polymer is present in an amount no less than 1% (preferably no less than 30%) by weight of the hydrophobic polymer phase and in an amount no more than 100%.

In another option, the mixture formed from the combination of the first and second components additionally comprises an agent suitable for cross-linking the hydrophobic polymer. In one example, the cross-linking agent is an ingredient of the first component and is dispersed or dissolved in the aqueous phase. In another example, the cross-linking agent is an ingredient of the second component and is dispersed or dissolved when oil is present or simply mixed with the superabsorbent polymer when oil is absent. Alternatively, the cross-linking agent can be contained in another component that does not contain an oil, a superabsorbent, or a polymer emulsion and which is mixed with the first and second components as part of the curing process. The cross-linking agent can also cross-link the oil or the combination of the oil and the hydrophobic polymer. The cross-linking agent can also cross-link the superabsorbent polymer.

Another embodiment of the present invention is a two component system for preparing the disclosed compositions. The first component is an emulsion of the hydrophobic polymer; the second component comprises the superabsorbent polymer; and the compositions disclosed herein are formed after the two components are combined and allowed to cure. The two component system can be transported to the application site in separate containers, such as in cans or buckets, as a "package". They can be advantageously premeasured so that they can be combined at the site without measuring. The "package" is preferably a kit, i.e., comprises separate containers placed within a box or carton and sold as an integral unit. In preferred embodiments of the invention, the first component can be contained within a smaller container, such as a plastic bag, and located within a larger container that also contains the second component. At the site, the larger container is opened, the plastic bag can then be accessed and opened to permit the first component to be released and mixed into the second component within the larger container.

There are many options for the segregation of the ingredients between two components prior to mixing and cure. A number of examples are described below.

Figure 5:
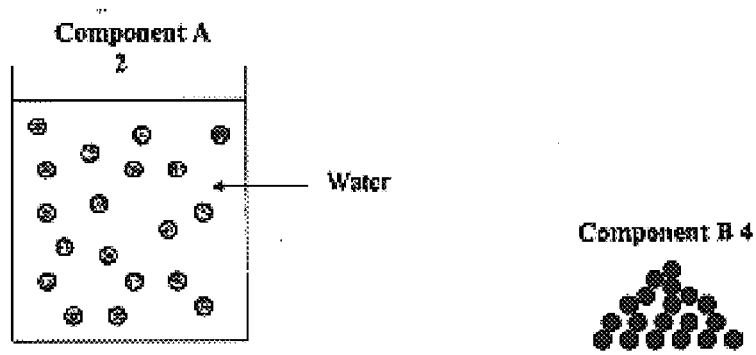
FIG. 5 is a diagram which illustrates a two component system. The first component 2 is an aqueous emulsion of a hydrophobic polymer 6 and the second component 4 is a dry particulate superabsorbent polymer.

In one option, the first component is an emulsion of a hydrophobic polymer and the second component is a dry particulate superabsorbent polymer. The pH of the emulsion of the hydrophobic polymer is configured such that the superabsorbent will absorb water when the two components are mixed. This two component system is depicted in FIG. 5.

Figure 6:
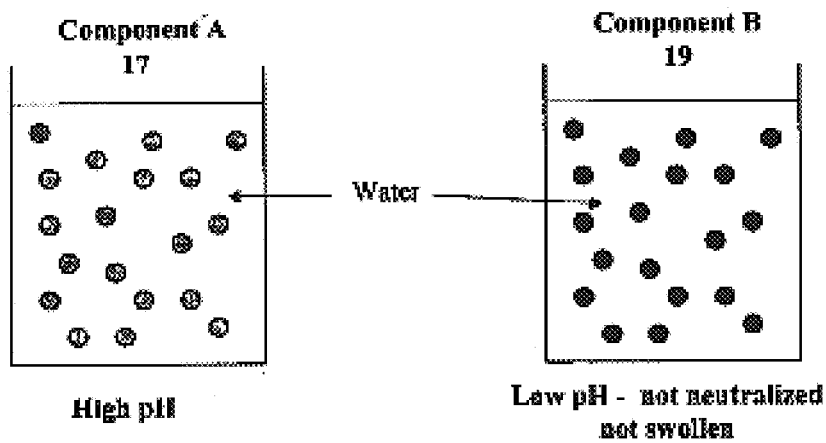
FIG. 6 is a diagram which illustrates a two component system. The first component 17 is an emulsion of a hydrophobic polymer particles 17A and the second component 19 is an aqueous emulsion of a superabsorbent polymer particles 21. The superabsorbent polymer particles absorb water when neutralized and the pH of emulsion is adjusted such that the superabsorbent polymer is not neutralized.

In a second option, the first component is an aqueous emulsion of a hydrophobic polymer and the second component is an aqueous emulsion of a superabsorbent polymer. The pH of the aqueous emulsion or dispersion of superabsorbent polymer is such that the particles absorb little or no water, i.e., is non-superabsorbing, or such that the water absorbing capacity of the polymer is significantly below its capacity. The pH of both components is configured so that the superabsorbent particles are neutralized and become "superabsorbent" when the two components are mixed or become significantly more absorbent when the two components are mixed. This two component system is depicted in FIG. 6.

Figure 7:
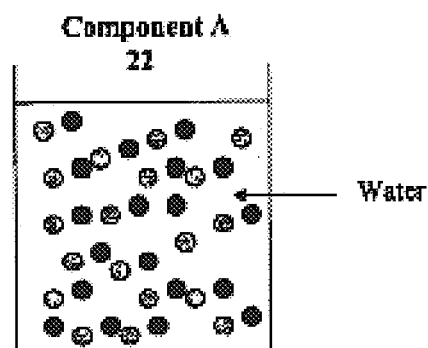
FIG. 7 is a diagram illustrating a two component system. The first component 22 is an aqueous emulsion of hydrophobic polymer particles 24 and superabsorbent polymer particles 26. The superabsorbent polymer 26 absorbs water only when neutralized and the pH of the dispersion 22 is adjusted such that the superabsorbent polymer is not neutralized. The second component is a solution for adjusting the pH of the first component to neutralize the superabsorbent polymer.

In another option, the first component is an emulsion of a hydrophobic polymer and a polymer which becomes superabsorbent when neutralized or which significantly increases its water absorbing capacity when neutralized. The pH of the emulsion is such that polymer particles are not superabsorbing or are significantly below their water absorbing capacity. A second component is then combined with the first and second components and comprises an acid or base which, when combined with the first component, adjusts the pH such that the polymer is neutralized and becomes superabsorbing or significantly increases its water absorbing capacity. This system is depicted in FIG. 7.

Figure 8:
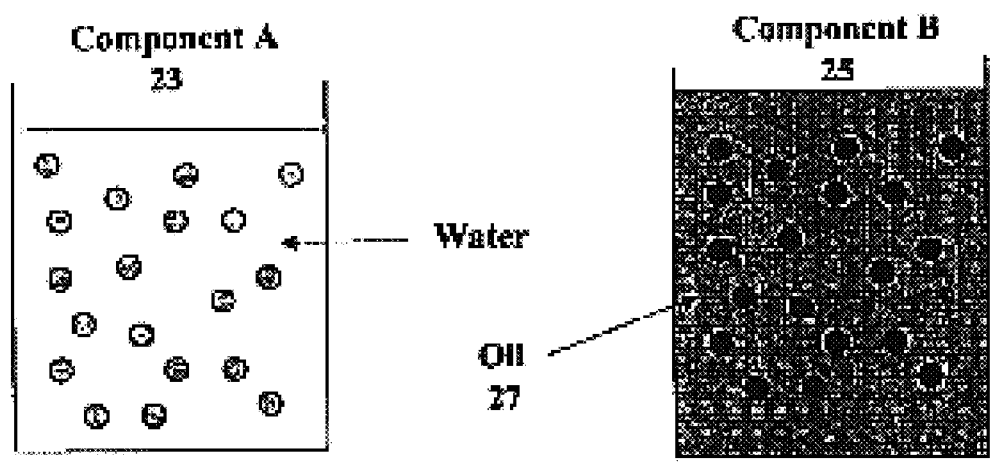
FIG. 8 is a diagram illustrating a two component system. The first component 23 is an aqueous emulsion of hydrophobic polymer particles 29 and the second component 25 is a dispersion of superabsorbent polymer particles 31 in oil 27.

In another option, the first component is an emulsion of a hydrophobic polymer and the second component is a mixture of an oil that can swell or dissolve hydrophobic polymer particles and superabsorbent polymer particles dispersed therein. The pH of the first component is adjusted such that the superabsorbent polymer particles absorb water when the two components are mixed or significantly increases its capacity to absorb water. This two component system is depicted in FIG. 8.

In another option, the first component is a mixture of an aqueous emulsion of a hydrophobic polymer and an oil emulsion and/or a tackifier resin emulsion. The second component is a dry particulate superabsorbent polymer, a superabsorbent polymer emulsion or a mixture of an oil and a superabsorbent.

Optionally, the articles of the present invention comprise a desiccant in place of or in addition to the superabsorbent polymer. A "desiccant" is a material which absorbs water, adsorbs water, or reacts with water. Suitable desiccants include inorganic compounds which react with water or absorb water such as calcium oxide, Portland Cement, magnesium oxide, hydraulic cements, high alumina cement, magnesium oxychloride, cement, calcium sulphate, magnesium sulfate, sodium sulfate, sodium silicate [$Na_2SiO_3$], magnesium phosphate, aluminum phosphate, calcium chloride, silica gel, zeolites, alumina and mixtures thereof.

A superabsorbent polymer is generally a cross-linked, hydrophilic polymer. Typically, the pore size of a superabsorbent polymer, which is controlled by the extent of cross-linking and the level of water absorption, is selected to be less than the size of the hydrophobic polymer particles so that water but not the hydrophobic particles are absorbed in the cure process. In some aspects, however, some hydrophobic polymer polymer particles may be taken up by the superabsorbent polymer. The superabsorbent polymer can be anionic, i.e., comprises polymerized monomers with an anionic or acidic group, cationic, i.e., comprises polymerized monomers with a cationic or basic group, neutral, i.e., comprises neutral polymerized monomers, or a combinations thereof. Examples of superabsorbent polymers include hydrolyzed maleic anhydride polymers and copolymers including copolymers with vinyl ethers, styrenes, ethylene, and other olefins, polyvinylpyrrolidone, sulfonated polystyrene, polysulfethyl acrylate, poly(2-hydroxyethylacrylate), polyacrylamide, poly(acrylic acid) and alkali metal salts thereof, poly(acrylic acid alkali metal salt), starch modified polyacrylic acid and alkali metal salts thereof, poly(starch modified acrylic acid alkali metal salt), hydrolyzed polyacrylonitrile and alkali metal salts thereof, poly(hydrolyzed polyacrylonitrile alkali metal salt), poly (vinyl alcohol acrylic acid alkali metal salt), salts thereof and mixtures thereof. Other options for the superabsorbent material include poly(acrylic acid alkali metal salt) such as poly(sodium acrylate), polyhydroxyalkyl acrylates and methacrylates, polyvinyl lactams, polyvinyl alcohols, polyoxyalkylenes, natural or synthetically modified polysaccharides, proteins, alginates, xanthan gums, guar gums, and cellulosics. Other examples include monovalent and polyvalent inorganic and organic salts of the foregoing polymers comprising acidic or basic functional groups. Alkali metal salts are preferred for acid functional polymers.

Preferred superabsorbent polymers include maleic anhydride/vinyl ether copolymer, poly(acrylic acid), copolymers of poly(acrylic acid), poly(methacrylic acid), copolymers of poly(methacrylic acid), starch modified polyacrylic acid (e.g., starch containing grafted side chains of 2-propenamide-co-2-propenoic acid) and alkali metal salts of the foregoing polymers.

As discussed above, certain polymers become superabsorbing or significantly increase their capacity to absorb water when neutralized. Thus, the polymer is not superabsorbent or is significantly below its water absorbing capacity when immersed in aqueous solution unless the pH is already at or is adjusted to a level at which the polymer is neutralized. For example, polymers and copolymers of acrylic acid, maleic anhydride (e.g., a maleic anhydride/vinyl ether copolymer), starch modified polyacrylic acid absorb significantly less water in strongly acidic solutions than in basic solutions, but become significantly more absorbent as the acidic solution is basified. Similarly, polymers and copolymers with amine polymers absorb significantly less water in strongly basic solutions, but become more significantly superabsorbent as the basic solution is acidified.

As also noted above, a number of polymers are more water absorbent at certain temperatures. For example, N-isopropylacrylamide is more absorbent at temperatures below 37° C. than above this temperature.

Suitable polymers for the hydrophobic polymer phase are those which can be dispersed in an aqueous medium or which can form an aqueous emulsion. Examples include natural rubber, prevulcanized natural rubber, butyl rubber, isobutene-isoprene copolymers, polyisoprene, polybutadiene, acrylonitrile-butadiene copolymers, stryrene-butadiene copolymers, chloroprene rubber, polyvinylacetate, vinyl acetate copolymerized with one or more vinyl esters of an alkanoic acid, acrylates and/or olefinic hydrocarbons, acrylics (i.e., homopolymers or copolymers of alkyl acrylates, alkyl methacrylates, acrylic acid and/or methacrylic acid), polyurethanes, polyvinylidene chloride, polyvinyl chloride, vinyl chloride-vinylidene chloride copolymers, polyvinylidene fluoride, blends of ployvinylidene fluoride and acrylics, ethylene-vinylacetate copolymers, polyvinyl chloride (PVC) (and co and terpolymers thereof), styrene-butadiene rubber (SBR), styrene-butadiene block copolymers (SBS), styrene-isoprene-styrene copolymers (SIS), styrene-ethylenebutylene-styrene block copolymers (SEBS) and mixtures thereof. Also suitable are emulsions of reactive oligomers including epoxy resin emulsions, polyurethane emulsions, emulsions of unsaturated polyesters, emulsions of amine functional resins, isocyannate emulsions, emulsions of carboxylic acid functional resins, emulsions of vinyl functional resins, emulsions of hydroxy functional resins, and emulsions of acrylate and methacrylate functional resins.

Preferred hydrophobic polymers include natural rubber, SBR and acrylics. Asphalt emulsions and coal tar emulsions can also be used, optionally in combination with a synthetic polymer emulsion. Preferred synthetic polymer emulsions for use with asphalt emulsions include SBR, SBS, natural rubber, isoprene, chloroprene, and butadiene. The hydrophobic polymer emulsion may also be a biopolymer emulsion like a protein emulsion or a lipid emulsion.

The polymers listed above can be prepared with other co-monomers that provide for other types of reactive functionality that can react with agents present in the composition, e.g., cross-linking agents which can act to cross-link the polymer. Examples of reactive functional groups include vinyl, epoxy, mercaptan, amine, isocyannate, hydroxyl, carboxylic acid, titinate, siloxy and acryloyl.

The selection of a suitable cross-linking agent depends on the type of hydrophobic polymer in the emulsion and the end use of the composition being prepared. Polymers, including natural rubber, prevulcanized natural rubber, butyl rubber, isobutene-isoprene copolymers, polyisoprene, polybutadiene, acrylonitrile-butadiene copolymers, stryrene-butadiene copolymers, SBS, SIS, that comprise unsaturation can be cross-linked with sulfur or sulfur donor compounds. These can be combined with accelerators. Peroxide curatives can also be used for these polymers.

A preferred vulcanization package, particularly for styrene-butadiene copolymers, comprises elemental sulphur as the sulphur donor for the system, zinc oxide as a vulcanization activator, and a mixture of zinc iso-propyl xanthate (ZIX) and zinc dibutyl dithiocarbamate dibutylamine complex (ZDBCX) as accelerators. These can be used in the preferred ranges, respectively, 0.5 to 15.0 parts sulphur based on parts hundred of rubber (hereinafter "phr"), 0.5 to 20.0 phr (ZnO), 0.1 to 5.0 phr (ZIX), and 0.1 to 5.0 phr (ZDBCX). Other known vulcanizing agents and/or packages are believed to be suitable for use in the invention. See e.g., U.S. Pat. No. 5,159,980, assigned to Halliburton, the entire teachings of which are incorporated herein by reference.

Polymers comprising carboxylic acid functional groups, such as carboxylated SBR and many acrylic polymers, are most commonly cured with metal oxides such as zinc oxide and the like. Chloroprene can also be cured with zinc oxide.

As noted above, the choice of cross-linking agent and the amount used depends on the functional groups present in the polymer and the end use of the resulting composition. For example, 1,$\omega$-diaminoalkanes can be used to cross-link polymers with electrophilic groups such as isocyanates and epoxides. 1,$\omega$-Dihalokanes can be used to cross-link polymers with nucleophilic groups such as sulfhydryls, amines, hydroxyls. Many other suitable cross-linking groups are known to one or ordinary skill in the art, who will be able to select appropriate groups along with conditions and quantities for effecting the cross-linking reaction.

Oils that are suitable for use in preparing the disclosed composition swell and/or dissolve the hydrophobic polymer of the polymeric emulsion of the first component. The oil selected depends on the end use of the composition being prepared. One of ordinary skill in the art will be able to select suitable oils which impart the desired properties to the composition being prepared. Options include paraffinic oils, naphthenic oils, aromatic oils, low molecular weight esters including adipates and phthalates. Vegetable oils can also be used.

Optionally, the disclosed compositions can comprise one or more additional ingredients to modify the properties of the composition. The type and quantity of ingredient will depend on the end use of the composition and the nature of the other materials which are found in the composition. Optional ingredients include reinforcing and non-reinforcing fillers, pigments, surfactants, antioxidants, ultraviolet light stabilizers, fibers, fabrics, mold release agents or lubricants, voids, tackifiers, coagulants or coascervants for emulsions, bioicides, coalescing agents and organic solvents. Typically, the disclosed compositions between 0% and no more than 90% by weight of an "optional" ingredient, preferably no more than 75% by weight.

Optionally, the disclosed compositions (two component systems and articles) are substantially free of cement and/or other inorganic desiccants, particularly when the superabsorbent polymer is cationic. In addition, the disclosed compositions are substantially free of bodily fluids. "Substantially free" means at least 99% by weight free, preferably at least 99.9% by weight free and more preferably 100% free. Thus, the present invention does not encompass the compositions formed when wound exuents are absorbed by hydrogel-containing bandages after being applied to wounds.

The disclosed compositions, as noted earlier, are particularly useful in the manufacture of articles, profiles, sealants, adhesives, and coatings which have a decorative and/or functional purpose. Articles, profiles, sealants, adhesives, and coatings manufactured from the disclosed compositions have many advantages over articles, profiles, adhesives, sealants, and coatings of the prior art that are manufactured from polymeric material. An important advantage of these compositions is the ability to rapidly process with little or no exotherm a liquid composition comprising an aqueous dispersion into a solid shape desired for end use without the need to remove the water. Water is retained, at least initially, in the conversion of the liquid composition into a solid. This feature allows for the rapid transformation from a liquid to a solid even for thick profiles. Articles, profiles, sealants, adhesives, and coatings produced from the disclosed compositions are fire resistant, can be prepared without heating or the use of the flammable and toxic solvents and without the need to drive off solvents. Processes for preparing articles, profiles, sealants, adhesives, and coatings comprising the disclosed compositions by these processes are described in greater detail below.

The disclosed compositions are particularly well suited for use in two component liquid, injection molding, which is a process for producing a molded article. A mixing device can be used to mix the ingredients just prior to injection into the mold or immediately thereafter in the mold. The ingredients are segregated into at least two components prior to molding, as described above. After curing, the molded article is separated from the mold. Although solvents can optionally be removed by heat or vacuum, cure is generally achieved without these additional manipulations.

The disclosed compositions can also be used in other molding processes, such as injection molding, transfer molding, compression molding, potting, encapsulation and the like. For example, injection molding can be carried out with the disclosed compositions, preferably divided or sectioned into pellets, using a reciprocating screw type injection molding machine that is normally used for thermoplastics. For transfer molding or compression molding, prepregs of extrusion compound, bulk molding compound or sheet molding compound prepared from the disclosed compositions, as described below, can be used.

For injection, transfer, or compression molding, a molding compound is produced first as a separate operation. A pelletized form of the molding compound is generally required for injection molding. Prepregs, much larger pieces of the molding compound, are generally required for transfer and compression molding. To produce molding compounds by extrusion compounding with the disclosed methods, a twin screw extruder is typically used. Ingredients can be added to one or more ports. The ingredients can be added as two or more streams (components) into the extruder. Mixing, absorption of water by the superabsorbent polymer (except when foaming is desired), coalescence of the hydrophobic polymer, and oil absorption (if an oil is used) is generally, although not necessarily completely, effected in the extruder. Cross-linking (if a cross-linking agent is used) generally occurs in the molding operation. The composition can then be extruded through a die at the end of the extruder. The extrudate can be cut into sections or pelletized, which can then be used for molding operations such as injection molding, transfer molding, or compression molding.

Batch types mixers may be used to produce molding compounds. Batch mixers include kneaders, such as twin sigma blade kneaders, banburys, roll mills, and the like. As for extrusion compounding, mixing, absorption of water by the superabsorbent, coalesence of the hydrophobic polymer particles, and absorption of oil by the hydrophobic polymer generally, although not necessarily completely, occur in the compounding step. Cross-linking generally occurs in the molding operation.

Bulk molding compound (BMC) is a fiber reinforced molding compound. Formulation ingredients are similar to those for extrusion molding compounds except that the formulation also comprises chopped inorganic or organic fibers. A batch type mixer can be used. Typically, all ingredients are mixed except the fiber, which is added late in the mixing process to avoid fiber fracture and excessive break-up of fiber bundles. The mixed BMC must be soft enough to be shaped into pre-pregs and then to be compression or transfer molded. Effecting complete water absorption by the superabsorbent polymer, coalescence, and oil absorption (if an oil is used) in the mixing process can result in compounds that are too stiff. Therefore, it may be desirable to effect only partial or no water absorption by the superabsorbent polymer, partial or no coalescence, and partial or no oil absorption (if an oil is used) in the mixing process. Instead, these cure mechanisms preferably occur during the molding process. Other alternatives to prepare a moldable mixture include the use of high levels of oil, e.g., a reactive oil. Cross-linking is generally effected in the transfer or compression molding operation.

Sheet molding compound (SMC) is another fiber reinforced molding compound. Sheet molding compound comprises the same basic ingredients as BMC, but the manufacturing process is different. All ingredients except the chopped fiber are mixed and coated onto a web, for example, a release liner or a belt in a continuous coating operation. The coating can be applied by any suitable method, as described below. Chopped fiber is metered onto the coated web and embedded into the compound. Another layer of the compound can optionally be metered onto the chopped fiber to embed it. The compound is then cut into pre-pregs and transfer molded or compression molded.

Optionally, the article can be foamed during any of the molding processes described above. For example, foaming occurs when the volume of uncured molding material is less than the volume of the mold. Vaporization of water induced by heat from the exotherm of curing, by vacuum and/or simply by externally heating the mold, can create the foaming. Foaming can also be induced by mixing air and an air entraining agent into the composition prior to injection.

Profiles may be manufactured in an extrusion process. A twin screw extruder may be used to both compound and extrude the composition into a profile. Mixing, absorption of water by the superabsorbent polymer (except when foaming is desired), coalescence of the hydrophobic polymer, and oil absorption (if an oil is used) are effected, completely or partially, in the extruder. The extrudate, the profile formed by extrusion of the compound through the die, can be cross-linked in hot air or in some heated liquid medium such as water, glycol, or oil. This process can be a continuous or a batch process. Alternatively, compounding may be done in a batch mixer and the profile may be formed with an extruder.

The disclosed compositions are also particularly useful as coatings. The coating can be applied to a surface or to a web to prepare a polymeric film, sheet, fabric and the like. Suitable webs include paper, plastic film, inorganic fabric, polymeric fabric and a casting belt. When used as a coating, the composition can be applied by brush, roller, squeegee, trowel, a knife over roll coater, a roll coater, gravure coater, wire wound rod or as a single component spray or a two component spray. In many applications it is desirable to reduce the amount of time between mixing and application. For this purpose, a static two component mixer can feed the two components directly onto a surface, roll or wire wound rod type coater. For example, a twin screw extruder can be used to both mix and coat, thereby drastically minimizing the time from mixing to coating.

When used as coatings, the quantities of each ingredient is as described above. Zero, one or more of the optional ingredients, including an oil, can be present. Advantageously, the disclosed compositions can be used as a coating for waterproofing applications. Waterproofing compositions are described below.

The disclosed compositions have many other utilities, including as waterstops, waterproofing membranes, encapsulation compounds, adhesives, sealants, absorbents, vapor permeable membranes, cushioning materials and in cosmetics, food and sustained delivery vehicles for pharmaceuticals. The ingredient type, the amount of each ingredient and the process of manufacture are varied to suit the application and desired end use properties. Uses for the disclosed compositions and preparative processes therefor are described in greater detail below.

When used as a pressure sensitive adhesive, the disclosed composition typically comprises an elastomer, a tackifier, and an oil (also referred to as a "plasticizer"). Some elastomers, such as acrylic esters comprising four or more carbon atoms in the ester component, are inherently pressure sensitive and may not require modification with a plasticizer and/or a tackifier. Other elastomers including SBR, polybutadiene, polyisoprene, butyl rubber, polyisobutylene and polychloroprene require compounding with a plasticizer and/or a tackifier to induce pressure sensitive properties.

Optional ingredients include a cross-linking agent, surfactants, reinforcing and non-reinforcing fillers, antioxidants, and UV stabilizers.

A pressure sensitive adhesive comprising the disclosed compositions is typically prepared from an elastomer emulsion, a tackifier emulsion and pure plasticizer, although the plasticizer can optionally be used as an emulsion as well. The tackifiers and plasticizers should be compatible with the rubber that is selected. Suitable tackifiers include emulsions of asphalt, coal tar, aliphatic hydrocarbons, aromatic hydrocarbons, polyterpenes, coumarone-indene resins and the like; suitable plasticizers include emulsions or pure forms of parafinnic oils, naphthenic oils, aromatic oils, liquid polyesters, liquid polybutenes and the like.

For pressure sensitive adhesives based on isoprene, butadiene, SBR, butyl rubber, polyisobutylene and chloroprene, the hydrophobic polymer phase comprises the hydrophobic polymer, the tackifier, and the oil. The weight fraction of hydrophobic polymer in the hydrophobic polymer phase is 20% to 90% by weight; the weight fraction of tackifier in the hydrophobic polymer phase is 10% to 75% by weight; the weight fraction of oil in the hydrophobic polymer phase is 0% to 50% by weight. The quantities of the other ingredients are as described above For pressure sensitive adhesives based on acrylics the hydrophobic polymer phase comprises the hydrophobic polymer and oil. The preferred weight fraction of hydrophobic polymer in the hydrophobic polymer phase is 65% to 100% by weight. The balance is oil. The quantities of the other ingredients are as described above.

Pressure sensitive adhesives comprising the disclosed compositions are prepared from two component compositions. For example, the adhesive is prepared from a first component comprising an emulsion of an elastomer mixed with an emulsion of a tackifier and a second component comprising a mixture of plasticizer and a superabsorbent polymer. The first and second components are mixed prior to use. In another example, the first component is an emulsion comprising the elastomer and optionally the tackifier and the second component is the dry solid desiccant. In yet another example, the first component is a polymer emulsion and the second component is oil and superabsorbent. In yet another example the first component is an emulsion of a polymer, and optionally a tackifier emulsion, and/or a plasticizer emulsion, and the second component is an aqueous dispersion of a superabsorbent maintained at a pH where little or no swelling occurs. The two components are combined and cure is triggered by adjusting the pH.

Pressure sensitive adhesives comprising the disclosed compositions can be utilized for the production of tape and laminated materials by continuous web coating processes, as described above. For tape production, the composition can be coated onto a release liner and laminated to a support sheet such as a plastic film, or vice versa. When used as a laminating adhesive, the composition is coated onto one web and laminated to another, thereby adhering one web to another. The final step is typically winding.

Two substrates can be joined together with a pressure sensitive adhesive of the present invention. The preferred method of application for pressure sensitive adhesives of the present invention is two component spray, whereby a pressure sensitive adhesive composition is applied to a substrate. After phase inversion and surface drying of the composition occurs a second substrate can be applied, with pressure, to an exposed surface of the pressure sensitive adhesive.

Alternatively, two substrates can be joined together before phase inversion of the pressure sensitive adhesive occurs. In this example, phase inversion occurs after joining.

Optionally, the tape or the laminate can be heated to effect a more rapid cure. However, heating is generally not necessary, and, in fact, one advantage of the present invention is that these processes be performed without heat. Therefore, it is possible to run these processes at high production rates because the composition need not be completely cured when manufactured. Complete cure can occur in the roll stock. Another advantage is that it is now possible to process adhesives that would normally be difficult to process by hot melt or solvent coating techniques. The pressure sensitive adhesives may also be used for assembly to glue objects together.

The disclosed compositions can also be used as a waterproofing composition or a coating. For example, the first and second components can be packaged in two separate containers, mixed and applied, for example, manually or by spraying equipment, as described above. The preferred compositions for waterproofing or coating comprise an emulsion of a hydrophobic polymer as one component and a mixture of superabsorbent polymer and oil as the second component. Preferred emulsions of hydrophobic polymers include those based on acrylics, isoprene, butadiene, butyl rubber, polyisobutylene and chloroprene. More preferred emulsions of hydrophobic polymers include those based on natural rubber and SBR. Preferred oils for compositions comprising natural rubber and SBR include paraffinic, naphthenic, and aromatic oils. Preferred superabsorbents include a copolymer of maleic anhydride and a vinyl ether, poly(acrylic acid), a copolymer of poly(acrylic acid), poly(methacrylic acid), a copolymer of poly(methacrylic acid), starch containing grafted side chains consisting of 2-propenamide-co-2-propenoic acid, and alkali metal salts of the foregoing. Preferred commercial superabsorbent products include the WATERLOCK series products from Grain Processing Corp., CARBOPOL series products from Noveon, and STABILEZE QM and other superabsorbent polymers products from International Specialty Products.

For waterproofing and coating compositions based on acrylics, isoprene, butadiene, SBR, butyl rubber, polyisobutylene and chloroprene, the hydrophobic polymer phase comprises the hydrophobic polymer, a tackifier, and an oil. The weight fraction of hydrophobic polymer in the hydrophobic polymer phase is 20% to 100% by weight; the weight fraction of tackifier in the hydrophobic polymer phase is 0% to 75% by weight; and the weight fraction of oil in the hydrophobic polymer phase is 0% to 75% by weight. The quantities of the other ingredients in the composition are as described above.

The disclosed composition are also ideally suited for use as waterstops for cold joints in concrete construction. The compositions can be designed to be pressure sensitive and/or water absorbing. Pressure sensitive adhesive compositions described above can be used as waterstops. In a preferred waterstop composition, the hydrophobic polymer is continuous and the water-swollen superabsorbent polymer is the disperse phase or, alternatively, both the hydrophobic polymer and the water-swollen superabsorbent are continuous.

The waterstop can be manufactured in the factory or at the job site. In the factory the composition can be mixed and extruded as a profile in the desired shape. The profile is placed in the cold joint onto a hardened concrete surface and held in place, for example, mechanically or fastened with glue. Concrete is then cast onto the hardened concrete surface with the extruded profile fastened thereto. Alternatively a two component composition can be mixed on site and applied as a liquid to a hardened concrete surface, and allowed time to cure before casting the concrete onto the hardened concrete surface. Alternatively, the two components can be spray-applied using two component spray equipment or as a bead or profile using a component mixer, meter, or extrusion equipment. The two compositions can also be applied with a two component, cartridge type caulking gun.

A waterstop that is both hydrophillic and pressure sensitive provides waterproofing protection for the cold joint in at least two ways. The waterstop swells in the presence of water from an external source to block and pressurize the cold joint. In addition, the material adheres to both faces of the concrete cold joint because the material is pressure sensitive. Waterstops that are pressure sensitive are prepared from ingredients and using quantities that are as described above for pressure sensitive adhesives. Waterstops that are not pressure sensitive can also be formulated using ingredient types and quantities that are as described above for waterproofing compositions and coatings.

In one example, the hydrophobic polymer phase in the pressure sensitive adhesive waterstop is continuous and comprises SBR, tackifier solids and an oil such a naphthenic oil. The weight fraction of the continuous phase relative to the entire composition is 55% to 80% by weight. The continuous phase comprises 25% to 90% by weight SBR, 10% to 65% by weight tackifier, and 0% to 50% by weight oil. The balance of the compositions is the discrete phase (water swollen superabsorbent phase) which comprises 0.5% to 10% by weight of a superabsorbent polymer such as polyvinylether-maleic anhydride copolymer. In one specific example, a pressure sensitive adhesive waterstop is prepared from the following liquid applied, two component system: Component A comprises a mixture of a 70% solids SBR emulsion and a 50% solids tackifier emulsion. The balance of component A is water. Component B comprises a naphthenic oil and polyvinylether-maleic anhydride copolymer.

In another example, the hydrophobic polymer phase of an acrylic pressure sensitive adhesive waterstop is continuous and comprises a pressure sensitive acrylic and a polyester oil such as an adipate or phthalate. The weight fraction of the continuous phase relative to the entire composition is 70% to 80% by weight; the continuous phase comprises 65% to 100% by weight acrylic, with oil making up the balance. The discreet phase is the water-swollen superabsorbent polymer phase, which comprises 0.5% to 10% by weight of a superabsorbent polymer such as polyvinylether-maleic anhydride copolymer.

Compositions of the present invention can be used as sealants using, for example, the waterproofing and coating compositions described above. Sealants can be applied by processes similar to those described above for waterstops.

Yet another utility for the disclosed compositions is as a cushioning material. Materials of this type generally comprise a high level of plasticizer, and optionally, a cross-linking agent. Cushioning materials can be molded, injection molded, or cast. Cross-linking, if present, is preferably carried out as the composition is shaped into an article or after the composition is shaped into an article. In one example of a cushioning material, the hydrophobic polymer phase is continuous and comprises 1% to 50% by weight of hydrophobic polymer; the balance is a suitable oil. The quantities of the remainder of the ingredients in the composition is as described above.

Another important utility of the disclosed compositions is as an absorbent. Optional ingredients include a plasticizer and a cross-linking agent. Other ingredients can be added as well. When used as an absorbent, it is preferred that the hydrophobic polymer occupy a continuous phase in the cured two phase composition. A polymer emulsion can be mixed with a dry particulate superabsorbent, a superabsorbent emulsion, or superabsorbent dispersed in oil by various mixing processes that have already been described. It is important to coat or form the composition shortly after mixing. Here, the mixed composition can be formed into a sheet by casting onto a casting belt after mixing. Another option is to coat onto a web-like plastic film, a fabric, or a release liner to produce a supported structure. Yet another option is to extrude a profile and use the extruder to mix as well as shape the composition.

Yet another utility for the disclosed compositions is as a medical device for the controlled delivery and/or release of a biologically active agent, e.g., a pharmaceutical, pesticide, fertilizer and the like. The hydrophilic phase and the hydrophobic phase of the composition alleviate solubility issues often associated with the delivery of such agents, including small-molecule and protein-based agents pharmaceutically active agents. With respect to pharmaceuticals, the release of an agent can be controlled by formulating the composition to erode at the desired pH. Therefore, by selecting the proper formulation, it is possible to control the release of the agent at different parts of the body and at a desired rate. For example, by formulating in the form of a pill or capsule that is resistant to acidic degradation but susceptible to degradation at neutral pH, the pharmaceutically active agent will pass through the stomach and be released in the lower part of the digestive tract. Systems of this type are particularly well suited for delivering protein-based agents. In addition, the device may also be formulated as a patch on the skin for controlled release of a pharmaceutical agent.

The invention is illustrated by the following examples, which are not intended to be limiting in any way.

EXEMPLIFICATION

Example 1

A two component formulation was prepared. The ingredients in each component and the quantities used are shown in the table below.

|  |  | No.1 | |
| --- | --- | --- | --- |
|  |  | Component A | Component B |
| Ingredient | | | |
| Trade Name | Type | (g) | (g) |
| INTEX 132 | SBR emulsion (70% solids by weight) | | 110.9 |
| SHELLFLEX 6212 | naphthenic oil | 77.64 | |
| STABILEZE QM | maleic anhydride vinyl ether copolymer superabsorbent | 1.7 | |
|  | Sulfur | 1.17 | |
|  | zinc oxide | 3.91 | |

-continued

|  |  | No.1 | |
| --- | --- | --- | --- |
|  |  | Component A | Component B |
| Ingredient | | | |
| Trade Name | Type | (g) | (g) |
|  | zinc isopropylxanthate | 2.34 | |
|  | zinc dibutyl dithiocarbamate dibutyl amine | 2.34 | |
| Component Total | | 89.1 | 110.9 |
| Composition Total | | 200 | |

As can be seen from the table, the ingredients in Component A were an oil, a superabsorbent polymer, and cross-linking agents; and Component B comprised a hydrophobic polymer emulsion.

Component A was prepared with a Silverson high speed rotor-stator type mixer. All ingredients, except superabsorbent, were charged into a container and mixed at 4000 rpm for 15 minutes. A single shaft, paddle type (about 200 rpm), vacuum mixer was used to incorporate the superabsorbent into the mixture of oil and cross-linking agents. This mixing step was run for one minute under vacuum. Component B was immediately added to Component A and the composition was mixed with the vacuum mixer. Significant thickening occurred within one minute. The composition was rubbery at this point. The sample was pressed into a 60 mil sheet. The composition was then allowed to cross-linked at room temperature for one week. Tensile strength and elongation were measured at a cross-head speed of 20"/minute. Results are shown below.

| Tensile Strength (psi) | Elongation (%) |
| --- | --- |
| 151.2 | 274.4 |

Example 2

A two component formulation comprising no oil was prepared and mixed as described in Example 1. The ingredients in each component are shown in the table below.

|  |  | No. 2 | |
| --- | --- | --- | --- |
|  |  | Component A | Component B |
| Ingredient | | | |
| Trade Name | Type | (g) | (g) |
| HARTEX 101 | natural rubber emulsion (60% solids by weight) naphthenic oil | 50 | 166 |
| STABILEZE QM | maleic anhydride vinyl ether copolymer superabsorbent | 3.3 | |
|  | Sulfur | 1.5 | |
|  | zinc oxide | 5 | |
|  | zinc isopropylxanthate | 3 | |
|  | zinc butyl | 3 | |

-continued

|  |  | No. 2 | |
|---|---|---|---|
| Ingredient | | Component A | Component B |
| Trade Name | Type | (g) | (g) |
| | dithiocarbamate dibutyl amine | | |
| Component Total | | 65.8 | 166.0 |
| Composition Total | | 231.8 | |

Tensile and elongation test results for the composition produced from mixing the two components are shown below.

| Tensile Strength (psi) | Elongation (%) |
|---|---|
| 563.1 | 264.9 |

Example 3

A two component composition was prepared as described below. The ingredients in each component and the amounts used are shown in the table below.

|  |  | No. 3 | |
|---|---|---|---|
| Ingredient | | Component A | Component B |
| Trade Name | Type | (g) | (g) |
| UCAR 123 | acrylic emulsion | | 125 |
| STABILEZE QM | maleic anhydride vinyl ether copolymer superabsorbent | 3.26 | |
| | Water | 21.74 | — |
| Component Total | | 25 | 125 |
| Component Total | | 150 | |

Component A is a dispersion of a superabsorbent polymer dispersed in water. The other component is an aqueous emulsion of a butyl acrylate styrene copolymer, which is pressure sensitive.

Component A was prepared using a high speed Cowels dissolver. A few minutes of mixing was required to produce a thick, paste-like material. Component A and Component B were charged into the vacuum mixer and mixed for two minutes. There was a significant increase in viscosity at this point, and the mixture had a spreadable, paste-like consistency. A 60 mil sheet was pressed between two sheets of PET release liner. The material was transformed into a rubber-like consistency after sitting for one day. Tensile strength was measured after one week. Results are shown below.

| Tensile Strength (psi) | Elongation (%) |
|---|---|
| 5.3 | 155.2 |

These results show that compositions of the present invention can be prepared without oil.

Example 4

Formulations were prepared and tested in a similar manner in comparison to Example 1 except that water was added to Component A for some formulations. Tensile strength and elongation were evaluated as a function of the volume fraction of the polymer and oil in the compositions.

|  | 1 | 4 | 5 | 6 |
|---|---|---|---|---|
| Weight Fraction Polymer and Oil | 0.78 | 0.7 | 0.64 | 0.22 |
| Weight Fraction Superabsorbent and Water | 0.22 | 0.3 | 0.36 | 0.78 |
| Tensile Strength (psi) | 151 | 44 | not tested | NA |
| Elongation (%) | 274 | 202 | not tested | NA |

INTEX 132 was used in Component B for all samples

SHELLFLEX 6212 naphthenic oil was used in Component A for all samples

Oil/rubber ratio was 1 for all samples

The weight fraction of polymer and water was adjusted by adding water

Component A in all samples comprised 5 parts STABILEZE QM superabsorbent/100 parts water 1.5 phr sulfur, 5 phr ZnO, 3 phr zinc isopropyl xanthate, 3 phr zinc dibutyl dithiocarbamate, dibutyl amine was used in Component A for all samples Formulation 1 had properties, i.e., tensile strength and elongation, similar to the composition prepared in Example 1. A solid rubbery mass was formed just after mixing. Formulation 4 had properties similar to Formulation 1. Formulation 5 exhibited a significant viscosity increase after mixing and formed a continuous rubbery phase. The tensile strength of the composition formed from Formulation 5 was lower than the tensile of the composition formed from Formulation 1. Formulation 6 did not exhibit a significant viscosity increase after mixing and was a low viscosity liquid after standing for several hours.

Formulations comprising a high volume fraction of polymer and oil exhibited desirable behavior in that the targeted "cure" process, water absorption leading to coalescence of the hydrophobic polymer, occurred as evidenced by the rubbery nature of the compositions and the measurable tensile strength and elongation.

These results show that compositions comprising a high weight fraction of hydrophobic polymer and oil exhibit useful mechanical properties compared with compositions comprising a high weight fraction of water-swollen superabsorbent. These results are consistent with the conclusions that compositions comprising a high weight fraction of hydrophobic polymer and oil comprise a continuous oil-swollen rubber phase because the oil-swollen hydrophobic polymer phase has high mechanical strength and the water-swollen superabsorbent phase has low mechanical strength.

Example 5

A water stop composition was prepared from a two component system consisting of the ingredients shown in the table below:

| Ingredient | | No. 5 | |
|---|---|---|---|
| Trade Name | Type | Component A (g) | Component B (g) |
| UCAR 123 | acrylic emulsion | | 200 |
| STABILEZE QM | maleic anhydride vinyl ether copolymer superabsorbent | 8 | |
| PLASTILIT 3060 | plasticizer | 26 | |
| Component Total | | 34 | 200 |
| Component Total | | 234 | |

Component A was mixed with a Cowels dissolver at medium speed for two minutes. Component B was added to A and mixed with a Cowels dissolver for two minutes. The composition was a thick paste at this point. It was used for hydrostatic pressure testing. The procedure is described below.

First a concrete slab fitted with metal posts was cast and the waterstop composition was spread on the surface with a spatula at an average thickness of ⅛". The waterstop was allowed to cure for 4 days. The specimen was then fitted with a tube that rested on top of the waterstop. Another slab of concrete was then cast on top of the waterstop. The hydrostatic pressure was tested by filling the tube with water and attaching to a regulated, pressurized water line. The pressure was raised in 5 psi increments each day. The sample did not fail up to 40 psi.

Example 6

Microscopic measurements were used to confirm the morphology of the disclosed compositions. Specifically, a first component comprising an emulsion of a hydrophobic polymer and a second component comprising a superabsorbent polymer dispersed in an oil were mixed. The first component also contained a water soluble fluorescent dye. After mixing, the water swollen superabsorbent polymer phase contains the fluorescent dye, which facilitated confocal examination.

The formulation used for the evaluation is shown below.

| | weight |
|---|---|
| Pt A | |
| Naphthenic oil | 70 |
| Vinyl ether-maleic anhydride superabsorbent | 1.5 |
| Pt B | |
| SBR Latex (70% solids) | 100 |
| Propidium iodide | 2* |
| *1 mg/ml (in H2O) | |

The first component is referred to as "Pt B" in the table above and includes the fluorescent dye propidium iodide, which was premixed with the SBR latex. The fluorescent dye was water soluble and insoluble in the hydophobic polymer. The dye was added to image the water-swollen superabsorbent polymer after mixing the two components. The second component comprising the superabsorbent polymer dispersed in oil is referred to as "Pt A" in the table above and was prepared by mixing with a high shear rotor-stator mixer at 3000 rpm for fifteen minutes.

The two components were charged to a vacuum mixer and mixed for 30 seconds under vacuum. After the cure was complete, a 30 mil sheet was quickly hand pressed between 2 sheets of silicone coated PET.

Figure 9:
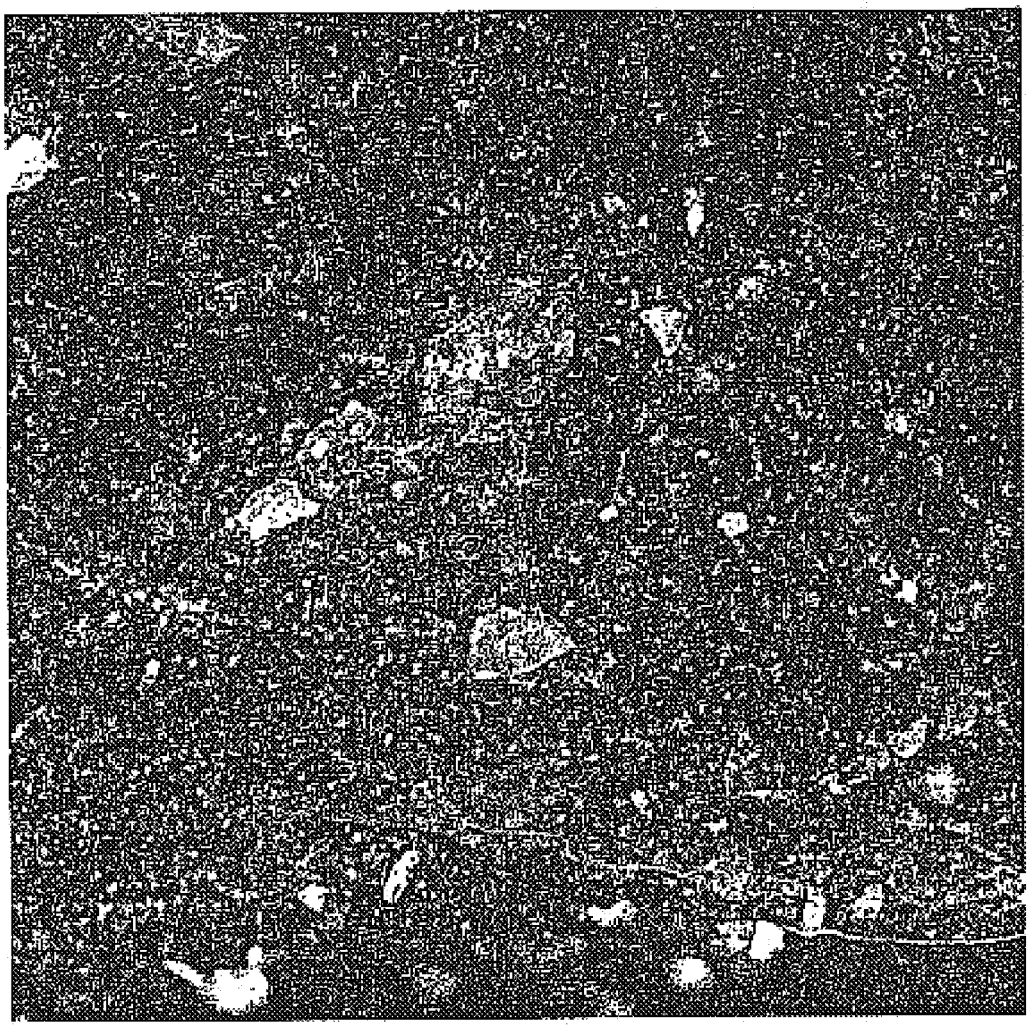
FIG. 9 is a digital microscopic image of a composition of the present invention. The light portions of the image indicate discrete water swollen superabsorbent polymer phase; and the dark portions indicate a continuous oil swollen hydrophobic polymer phase.

The specimen was imaged on a LSM 410 confocal microscope using a 20×objective. a Photomicrograph is shown in FIG. 9. As can be seen from FIG. 9, the disperse phase fluoresced, which is attributed to the water-swollen superabsorbent. The continuous phase was dark which is attributed to the oil-swollen hydrophobic polymer. These results are consistent with the formation of a two phase morphology from mixing a two component composition of the present invention.

Example 7

The compositions of the present invention are water absorbent. This is illustrated with a composition prepared from the formulation listed below.

| Ingredient | Level (g) |
|---|---|
| Component A | |
| naphthenic oil | 81.5 |
| iron oxide | 0.6 |
| sulfur | 1.0 |
| zinc oxide | 3.2 |
| zinc isopropylxanthate | 1.6 |
| zinc dibutyl dithiocabamate | 1.6 |
| dibutyl amine | 0.5 |
| starch grafted with copolymer of 2-propenamide concentrate of clay thickener and naphthenic oil | 10.0 |
| Total | 100.0 |
| Component B | |
| Natural rubber emulsion (60% solids) | 100 |

Figure 10:
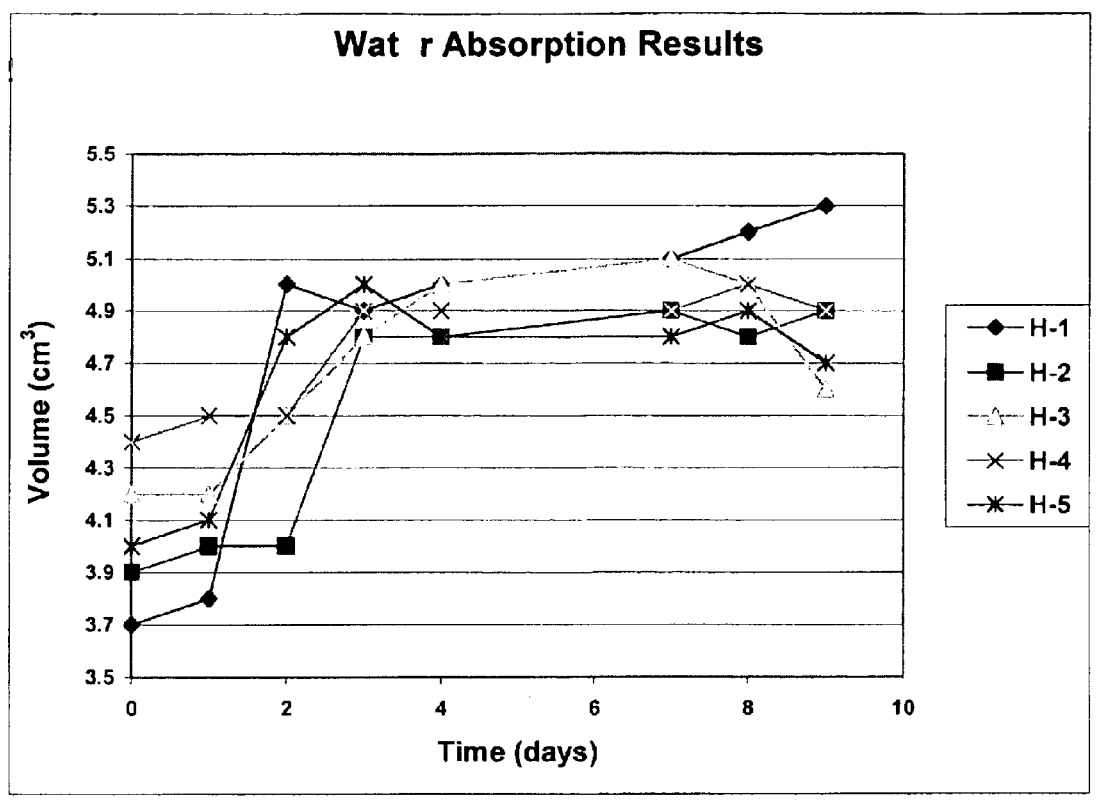
FIG. 10 is a graph showing the amount of water in $cm^3$ absorbed by a composition of the present invention over time in days while being immersed in water. The composition had been pre-dried to drive off water in the "as made" composition. The graph shows the absorption of water by five specimens H-1 through H-5 taken from the same composition.

The two components shown were applied to silicone coated release paper with a two component spray equipment. The sheets were heated for two days at 160° F. to effect vulcanization and drive off water that was contained in the water-swollen superabsorbent polymer phase in the "as made" composition. The volume of the dried compositions was measured using a graduated cylinder partially filled with water. A sample of the dried composition was submerged in the graduated cylinder containing water. The displacement is the volume of the dried sample. The dried samples were immersed in water and the volume was measured as a function of soak time. After immersion samples are patted with a paper towel to remove surface moisture, and the volume was measure by the procedure described above. The results are shown in FIG. 10 below. Five specimens were evaluated for the one composition. The average water absorption was 16.9% by volume after 9 days.

Example 8

All formulations were made from two component compositions. For all compositions, one component was a natural rubber emulsion, HARTEX 101. The second component comprised naphthenic oil, SHELLFLEX 6212, superabsorbent polymer, and the same vulcanization package as described in Example 1. For all formulations the level of superabsorbent was 3% on water and the oil/dry rubber ratio was 0.5. Formulations and test specimens are prepared as described in Example 1 with the exception that the specimens were cured at 160° F. for two days prior to mechanical testing. Phase inversion occured for all three samples within 1 minute from the time that mixing of the two components was initiated. All samples exhibited similar tensile strength and elongation. See results below.

| Superabsorbent | Tensile psi | Elongation Percent |
| --- | --- | --- |
| STABILEZE QM | 600 | 1017 |
| CARBOPOL 674 | 596 | 1055 |
| WATERBLOCK A100 | 576 | 1105 |

These results show that phase inversion can be effected with a variety of superabsorbents.

While this invention has been particularly shown and described with references to preferred embodiments thereof, it will be understood by those skilled in the art that various changes in form and details may be made therein without departing from the scope of the invention encompassed by the appended claims.

What is claimed is:

1. A composition comprising a hydrophobic polymer phase and a water-swollen superabsorbent polymer phase, wherein the composition is substantially free of cement when the superabsorbent polymer is cationic, wherein the hydrophobic polymer phase comprises a hydrophobic polymer dissolved in an oil or plasticizer, wherein the superabsorbent polymer is starch containing grafted side chains of 2-propenamide-co-2-propenoic acid or an alkali metal salt thereof and wherein the composition is substantially free of water from a bodily fluid.

2. A kit, wherein the first container contains an emulsion of a hydrophobic polymer, the second container contains a composition comprising a superabsorbent polymer, and wherein the emulsion of the hydrophobic polymer and the composition comprising the superabsorbent polymer form a composition comprising a hydrophobic polymer phase and a water-swollen superabsorbent phase when mixed.

3. The kit of claim 2 wherein the second container contains a composition consisting of the superabsorbent polymer.

4. The kit of claim 2 wherein the composition comprising the superabsorbent polymer is a dispersion of the superabsorbent polymer in an oil or a plasticizer.

5. A kit comprising a first container and a second container, wherein the first container contains an emulsion of a hydrophobic polymer, the second container contains a dispersion of a superabsorbent polymer in an oil or a plasticizer, wherein the oil or plasticizer additionally comprises a cross-linking agent for cross-linking the hydrophobic polymer and wherein the the emulsion of the hydrophobic polymer and the dispersion of the superabsorbent polymer form a composition comprising a hydrophobic polymer phase and a superabsorbent polymer phase when mixed.

6. The kit claim 2 wherein the hydrophobic polymer phase is at least 30% by weight of the composition formed after mixing the the emulsion of the hydrophobic polymer and the composition comprising the superabsorbent polymer.

7. A kit comprising a first container and a second container, wherein the first container contains an emulsion of a hydrophobic polymer, the second container contains a composition comprising a superabsorbent polymer, wherein the superabsorbent polymer comprises acidic or basic functional groups, wherein the superabsorbent polymer becomes superabsorbent after being neutralized or can absorb at least two times as much water after being neutralized than before being neutralized, and the the emulsion of the hydrophobic polymer and the composition comprising the superabsorbent polymer form a composition comprising a hydrophobic polymer phase and a superabsorbent polymer phase when mixed.

8. The kit of claim 7 wherein the composition comprising the superabsorbent polymer is an aqueous dispersion of the superabsorbent polymer and wherein the aqueous dispersion has a pH at which the polymer is non-superabsorbing or pre-water swollen.

9. The kit of claim 2 wherein the superabsorbent polymer is a maleic anhydride/vinyl ether copolymer, poly(acrylic acid), copolymers of poly(acrylic acid), poly(methacrylic acid), copolymers of poly(methacrylic acid), starch modified polyacrylic acid or alkali metal salt thereof.

10. The kit of claim 9 wherein the superabsorbent polymer is starch containing grafted side chains of 2-propenamide-co-2-propenoic acid or an alkali metal salt thereof.

11. The kit of claim 2 wherein the hydrophobic polymer is natural rubber, styrene butadiene rubber or acrylic.

12. The kit of claim 2 wherein the emulsion of the hydrophobic polymer or the the composition comprising the superabsorbent polymer additionally comprises one or more components selected from a reinforcing filler, a non-reinforcing filler, a pigment, a surfactant, an antioxidant, a UV stabilizer, a fiber, a mold release agent, a lubricant, a void, a tackifier, a coagulant, a coascervant for emulsions, biocide, coalescing agent or an organic solvent.

13. A method of preparing a composition comprising a hydrophobic polymer phase and a water-swollen superabsorbent polymer phase, said method comprising the step of mixing an emulsion of a hydrophobic polymer and a composition comprising a superabsorbent polymer.

14. The method of claim 13 said method comprising the step of mixing an emulsion of a hydrophobic polymer phase and a composition consisting of the superabsorbent polymer.

15. The method of claim 13 wherein the composition comprising the superabsorbent polymer is a dispersion of the superabsorbent polymer in an oil or plasticizer.

16. The method of claim 15 wherein the the dispersion of the superabsorbent polymer additionally comprises a cross-linking agent for the hydrophobic polymer and wherein the emulsion of the hydrophobic polymer and the composition comprising the superabsorbent polymer are mixed under conditions suitable for cross-linking the hydrophobic polymer, thereby forming the composition and cross-linking the hydrophobic polymer.

17. The method of claim 13 wherein the superabsorbent polymer comprises acidic or basic functional groups and becomes superabsorbent or increases its water absorbing capacity when neutralized, wherein the composition comprising the superabsorbent polymer is at a pH such that the superabsorbent polymer is non-superabsorbing or pre-water-swollen and wherein the mixture is at or adjusted to a pH such that the superabsorbent polymer is neutralized.

18. The method of claim 13 wherein the superabsorbent polymer is a polymer or copolymer of acrylic acid, a polymer or copolymer of maleic anhydride, a starch modified acrylic acid or a alkali metal salt thereof.

19. The method of claim 13 wherein the hydrophobic polymer phase comprises at least 30% by weight of the composition formed after mixing the first and second components.

20. The method of claim 13 wherein the superabsorbent polymer is a maleic anhydride/vinyl ether copolymer, poly(acrylic acid), copolymers of poly(acrylic acid), poly(methacrylic acid), copolymers of poly(methacrylic acid), starch modified polyacrylic acid or alkali metal salt thereof.

21. The method of claim 20 wherein the superabsorbent polymer is starch containing grafted side chains of 2-propenamide-co-2-propenoic acid or an alkali metal salt thereof.

22. The method of claim 13 wherein the hydrophobic polymer is natural rubber, styrene modified butadiene or acrylic.

23. The method of claim 13 wherein the emulsion of the hydrophobic polymer or the composition comprising the superabsorbent polymer additionally comprises one or more components selected from a reinforcing filler, a non-reinforcing filler, a pigment, a surfactant, an antioxidant, a UV stabilizer, a fiber, a mold release agent, a lubricant, a void, a coagulant, a coascervant for emulsions, biocide, coalescing agent, or an organic solvent.

24. A method of preparing a composition comprising a hydrophobic polymer phase and a water-swollen superabsorbent polymer phase from an aqueous emulsion comprising a hydrophobic polymer and a polymer which becomes superabsorbing or water-swellable above or below a threshold temperature, wherein the emulsion is at a temperature at which the polymer is non-superabsorbing or pre-water swellable said method comprising the step of adjusting the temperature of the emulsion such that the polymer becomes superabsorbing or water swellable.

25. The kit of claim 2 wherein the kit is a package.

* * * * *